US00RE47075E

(19) United States
(12) Reissued Patent
Hanson et al.

(10) Patent Number: US RE47,075 E
(45) Date of Reissued Patent: Oct. 2, 2018

(54) SYSTEM AND METHOD FOR DETERMINING AND CONTROLLING GAIN MARGIN IN AN RF REPEATER

(71) Applicant: CommScope Technologies LLC, Hickory, NC (US)

(72) Inventors: Van Hanson, Forest, VA (US); Christopher Ranson, Concord, VA (US)

(73) Assignee: CommScope Technologies LLC, Hickory, NC (US)

(21) Appl. No.: 15/424,631

(22) Filed: Feb. 3, 2017

Related U.S. Patent Documents

Reissue of:
(64) Patent No.: 8,948,687
Issued: Feb. 3, 2015
Appl. No.: 12/635,887
Filed: Dec. 11, 2009

(51) Int. Cl.
*H04B 7/15* (2006.01)
*H04B 7/155* (2006.01)

(52) U.S. Cl.
CPC ..... *H04B 7/15578* (2013.01)

(58) Field of Classification Search
CPC ..... H04B 7/15578
USPC ..... 455/11.1
See application file for complete search history.

(56) References Cited

U.S. PATENT DOCUMENTS 3,085,200 A 4/1963 Goodall
3,086,080 A 4/1963 Gordon
3,979,683 A 9/1976 Ikeda
4,363,129 A 12/1982 Cohn et al.
4,383,331 A * 5/1983 Davidson ..... 455/24
4,561,067 A 12/1985 McKeown
4,776,032 A * 10/1988 Odate et al. ..... H04B 1/525 455/10
4,845,746 A 7/1989 Li
5,040,189 A 8/1991 Braun
5,095,528 A * 3/1992 Leslie et al. ..... 455/10
(Continued)

FOREIGN PATENT DOCUMENTS

CN 1470144 1/2004
CN 1470144 A 1/2004
(Continued)

OTHER PUBLICATIONS

State Intellectual Property Office of the People's Republic of China, "First Office Action for CN Application No. 201080056179.2", "Foreign Counterpart to U.S. Appl. No. 12/635,887", dated Jul. 18, 2014, pp. 1-10, Published in: CN.
(Continued)

*Primary Examiner* — Nick Corsaro
(74) *Attorney, Agent, or Firm* — Fogg & Powers LLC

(57) ABSTRACT

An apparatus for repeating signals includes a receive antenna for capturing a receive signal, processing circuitry for processing the receive signal to form a repeated signal, and a transmit antenna for transmitting the repeated signal. The processing circuitry includes gain circuitry for gain in the repeated signal and decorrelation circuitry configured for modifying the repeated signal with respect to the receive signal to thereby decorrelate the repeated signal from the receive signal. The processing circuitry further comprises circuitry configured for calculating a gain margin for the apparatus utilizing the decorrelated receive and repeated signals.

58 Claims, 4 Drawing Sheets

(56) References Cited

U.S. PATENT DOCUMENTS

| | | | | |
|---|---|---|---|---|
| 5,134,464 | A | 7/1992 | Basile et al. | |
| 5,163,044 | A | 11/1992 | Golden | |
| D395,427 | S | 6/1998 | Arora et al. | |
| D396,455 | S | 7/1998 | Bier | |
| 5,790,632 | A | 8/1998 | Antonio et al. | |
| 5,835,848 | A | 11/1998 | Bi et al. | |
| D403,673 | S | 1/1999 | Arora et al. | |
| D404,386 | S | 1/1999 | Mullin | |
| 5,867,792 | A | 2/1999 | Ichiyoshi | |
| 5,974,301 | A * | 10/1999 | Palmer et al. | 455/63.1 |
| D432,507 | S | 10/2000 | Brockel et al. | |
| 6,141,531 | A | 10/2000 | Williams | |
| D438,213 | S | 2/2001 | Herget et al. | |
| 6,229,992 | B1 | 5/2001 | McGeehan et al. | |
| 6,253,060 | B1 | 6/2001 | Komara et al. | |
| D448,777 | S | 10/2001 | Kuhlman | |
| 6,385,176 | B1 | 5/2002 | Iyengar | |
| 6,385,435 | B1 | 5/2002 | Lee | |
| 6,484,012 | B1 | 11/2002 | Nche | |
| 6,490,010 | B1 * | 12/2002 | Shibuya et al. | 348/735 |
| 6,539,204 | B1 | 3/2003 | Marsh | |
| 6,684,058 | B1 | 1/2004 | Karacaoglu et al. | |
| 6,697,603 | B1 | 2/2004 | Lovinggood et al. | |
| 6,745,003 | B1 | 6/2004 | Maca | |
| 6,807,399 | B1 | 10/2004 | Shim | |
| 6,831,900 | B2 | 12/2004 | Blake | |
| 6,839,539 | B2 | 1/2005 | Durrant et al. | |
| 6,915,112 | B1 | 7/2005 | Sutton et al. | |
| 6,940,893 | B1 | 9/2005 | Pinkney | |
| 7,035,321 | B2 | 4/2006 | Balaberda | |
| 7,043,203 | B2 | 5/2006 | Miquel et al. | |
| 7,046,960 | B2 * | 5/2006 | Takemoto | H04B 1/525 455/12.1 |
| 7,088,953 | B2 | 8/2006 | Bongfeldt | |
| 7,133,442 | B2 | 11/2006 | Hamdi | |
| 7,200,134 | B2 | 4/2007 | Proctor, Jr. et al. | |
| 7,355,993 | B2 | 4/2008 | Adkins | |
| 7,423,983 | B1 | 9/2008 | Li et al. | |
| 7,546,084 | B2 | 6/2009 | Kennedy, Jr. et al. | |
| 7,558,528 | B2 | 7/2009 | King | |
| 7,558,575 | B2 | 7/2009 | Losh | |
| 7,596,352 | B2 | 9/2009 | Ding et al. | |
| 7,809,047 | B2 * | 10/2010 | Kummetz | 375/211 |
| 2002/0044594 | A1 * | 4/2002 | Bongfeldt | H04B 7/15507 375/213 |
| 2002/0191779 | A1 | 12/2002 | Pham | |
| 2004/0014438 | A1 * | 1/2004 | Hasarchi | 455/119 |
| 2004/0209571 | A1 | 10/2004 | Saegrov | |
| 2005/0215193 | A1 * | 9/2005 | Kummetz | H04B 7/15585 455/1 |
| 2006/0019604 | A1 * | 1/2006 | Hasarchi | 455/15 |
| 2006/0172781 | A1 | 8/2006 | Mohebbi | |
| 2007/0161347 | A1 | 7/2007 | Ma | |
| 2010/0094631 | A1 * | 4/2010 | Engdegard et al. | 704/258 |
| 2010/0284445 | A1 * | 11/2010 | Barriac et al. | 375/211 |
| 2010/0285736 | A1 * | 11/2010 | Gore et al. | 455/7 |

FOREIGN PATENT DOCUMENTS

| | | |
|---|---|---|
| EP | 0227393 | 7/1987 |
| EP | 0227393 | 2/1995 |
| EP | 0905914 | 3/1999 |
| EP | 1109332 | 6/2001 |
| WO | 2008027531 | 3/2008 |

OTHER PUBLICATIONS

European Patent Office, "European Office Action for EP Application No. 10791026.7", dated Feb. 19, 2016, pp. 1-4, Published in: EP.

United States Patent and Trademark Office, "Final Office Action", "from U.S. Appl. No. 12/635,887", dated Oct. 1, 2012, pp. 1-16, Published in: US.

United States Patent and Trademark Office, "Supplemental Notice of Allowability", "from U.S. Appl. No. 12/635,887", dated Dec. 29, 2014, pp. 1-3, Published in: US.

United States Patent and Trademark Office, "Notice of Allowance", "from U.S. Appl. No. 12/635,887", dated Sep. 12, 2014, pp. 1-21, Published in: US.

United States Patent and Trademark Office, "Office Action", "from U.S. Appl. No. 12/635,887", dated Mar. 28, 2012, pp. 1-22, Published in: US.

United States Patent and Trademark Office, "Office Action", "from U.S. Appl. No. 12/635,887", dated Apr. 18, 2014, pp. 1-14, Published in: US.

European Patent Office, "Extended European Search Report for EP Application No. 17163692.1", "Foreign Counterpart to U.S. Appl. No. 12/635,887", dated Jul. 13, 2017, pp. 1-9, Published in: EP.

International Search Authority, "International Search Report and Opinion for PCT/US2010/059198", "Foreign Counterpart to U.S. Appl. No. 12/635,887", dated Feb. 11, 2011, pp. 1-13, Published in: WO.

Anderson C.R. et al., "Antenna Isolation, Wideband Multipath Propagation Measurements, and Interference Mitigation for On-frequency Repeaters", "Southeastcon, Jan. 1, 2004, Proceedings. IEEE Greensboro, North Carolina, USA, Piscataway, NJ, USA, IEEE", dated Jan. 1, 2004, pp. 1-5.

Lyons R.G., "Digital Filter Terminology", "Addison Wesley Longman Inc., Appendix F", 1997, pp. 1-9.

Thirteen-page International Search Report and Written Opinion mailed Feb. 11, 2011, for PCT counterpart case No. PCT/US2010/059198.

Five-page article, Anderson, C.R., et al., "Antenna Isolation, Wideband Multipath Propagation Measurements, and Interference Mitigation for On-Frequency Repeaters" Southeastcon, Jan. 1, 2004, Proceedings. IEEE Greensboro, North Carolina, USA, Piscataway, NJ, USA, IEEE.

Nine-page enticle, Lyons, R.G., "Digital Filter Terminology", Addison Wesley Longman Inc., Appendix F, pp. 1-9. 1997.

* cited by examiner

SYSTEM AND METHOD FOR DETERMINING AND CONTROLLING GAIN MARGIN IN AN RF REPEATER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of application Ser. No. 12/635,887, filed Dec. 11, 2009 which issued as U.S. Pat. No. 8,948,687.*

FIELD OF THE INVENTION

The present invention is directed generally to repeaters or signal repeating devices for wireless communications, and more particularly to an apparatus and method for determining and controlling gain margin in signal repeating systems.

BACKGROUND OF THE INVENTION

In existing wireless technologies, signal repeating devices, or "repeaters" are used to extend the coverage of the overall wireless system beyond traditional base stations. For example, an overall wireless system may consist of a plurality of base stations that communicate with each other and operate to provide a defined coverage area. In such coverage areas, there are often smaller geographical areas that have very low signal reception with respect to one or more of the base stations. For example, such areas of low signal coverage may be within buildings or areas that are otherwise obstructed. Rather than implementing another costly and large base station to provide coverage to such low signal areas, repeaters are utilized.

A repeater essentially has a donor antenna that is in communication with one or more base stations. The repeater receives downlink signals from the base station, processes and amplifies those signals, and then re-transmits or "repeats" those signals through a coverage antenna into the area that otherwise has low signal reception or low signal power. Signals from mobile devices, such as wireless phones or other equipment, send any uplink signals back to the repeater, and that uplink traffic is repeated back to a base station.

For example, referring to FIG. 1, a basic wireless communication system 10 might include a base station 12 that communicates with a repeater system 14 having a donor antenna 16, a coverage antenna 18, and processing electronics 20 that are positioned between the antennas 16 and 18 to process and amplify the repeated signal. Accordingly, downlink wireless signals 22 are received by the donor antenna 16 of the repeater, and are then amplified and repeated through the coverage antenna 18 as downlink signals 22a. The downlink signals 22a are received by one or more wireless communication devices, such as mobile phones 24. Similarly, in an uplink direction, as indicated by reference numerals 26 and 26a, the wireless device 24 communicates signals 26a back to the coverage antenna and the repeated signal 26 is then provided as an uplink signal back to the base station 12. As would be readily understood by a person of ordinary skill in the art, such repeater systems 14 can take many different forms and are not limited only to devices conventionally called "repeaters".

Some repeater systems provide frequency translation in the repeated signals such that signals received from the base station by the repeater are then transmitted at a different frequency to the mobile devices or other wireless devices. In such a scenario, signal isolation between the antennas and the problems with feedback from the transmitter coverage antenna to the receiver or donor antenna is not a problem because the signals handled by those different antennas are at different frequencies, allowing the feedback signal to be attenuated with a frequency selective filter. However, in a non-translating repeater, the isolation between the two opposing antennas or sets of antennas can limit the performance of the repeater.

If there is insufficient attenuation or isolation between the transmit side output and the receive side input, then the repeater can oscillate due to the feedback signals. This causes significant performance problems. To ensure stability, it is generally desirable to provide gain or amplification in the repeater that is less than the isolation between the antennas. Generally, a repeater will be configured and operated to maintain a certain gain margin to determine how close it is to operating in an oscillatory or unstable condition. If the gain margin is too small, then the repeater's gain might be reduced or attenuated until the gain margin is above an acceptable threshold.

Generally, when a repeater is installed or commissioned, the antenna isolation between the receive and transmit antennas can be measured, and the gain margin for the repeater might be estimated by calculating the gain margin as being the (antenna isolation) minus (repeater gain). However, while such a gain margin determination and gain setting may be sufficient at initial installation, such an installation methodology for providing stability in a repeater is not adaptive. That is, the initial settings and gain margin do not take into account or accommodate any changes in the antenna isolation or any changes in the gain of the repeater. Accordingly, it is desirable to periodically or continuously measure gain margin during normal repeater operation, and to then make the necessary adjustments to the repeater's gain to ensure stability.

During normal repeater operations, both the input signal (that is, the signal to be amplified and re-transmitted) and the feedback signal (that is, the unwanted signal that is fed back from the transmit antenna) are combined into one receive signal at the receive antenna. To measure the gain margin, the level of each signal needs to be determined separately. However, in a non-translating repeater, a problem with separating the signals arises because the input signal and the feedback signal are essentially the same signal with the same frequency. The feedback signal is slightly delayed in time.

One possible way to separate the input feedback signal would be to momentarily connect the repeated transmitter to a test signal, and then measure the level of the test signal at the receive input of the repeater. Measuring the test signal in the presence of the input signal may be utilized to determine the repeater's antenna isolation and gain margin. However, during such a solution, the input repeater signal is not transmitted during the time of the test signal. This causes a momentary and undesirable interruption of the service of the repeater. For example, it might lead to dropped calls or other service interruptions in the coverage area of the repeater.

Accordingly, it is desirable to provide a repeater that has adaptive gain margin measurements and adjustment while continuing uninterrupted service.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

The present invention provides a signal repeating apparatus, or a repeater that provides adaptive gain adjustment. Particularly, the inventive repeater determines the gain margin of the repeater and uses the measured gain margin to adjust the gain of the repeater to avoid oscillation and instability. The repeater modifies the repeated signals with respect to the receive signals to decorrelate those signals so that the gain margin may be determined. In one embodiment, the modification is made using a frequency shifting circuit to add a frequency shift and provide repeated signals that are slightly frequency-shifted from the input signals originally received by the repeater. Processing circuitry uses the frequency-shifted repeated signals to determine gain margin. The processing circuitry then uses the measured gain margin to adaptively adjust the repeater gain to maintain the desired gain margin to prevent instability.

Figure 1:
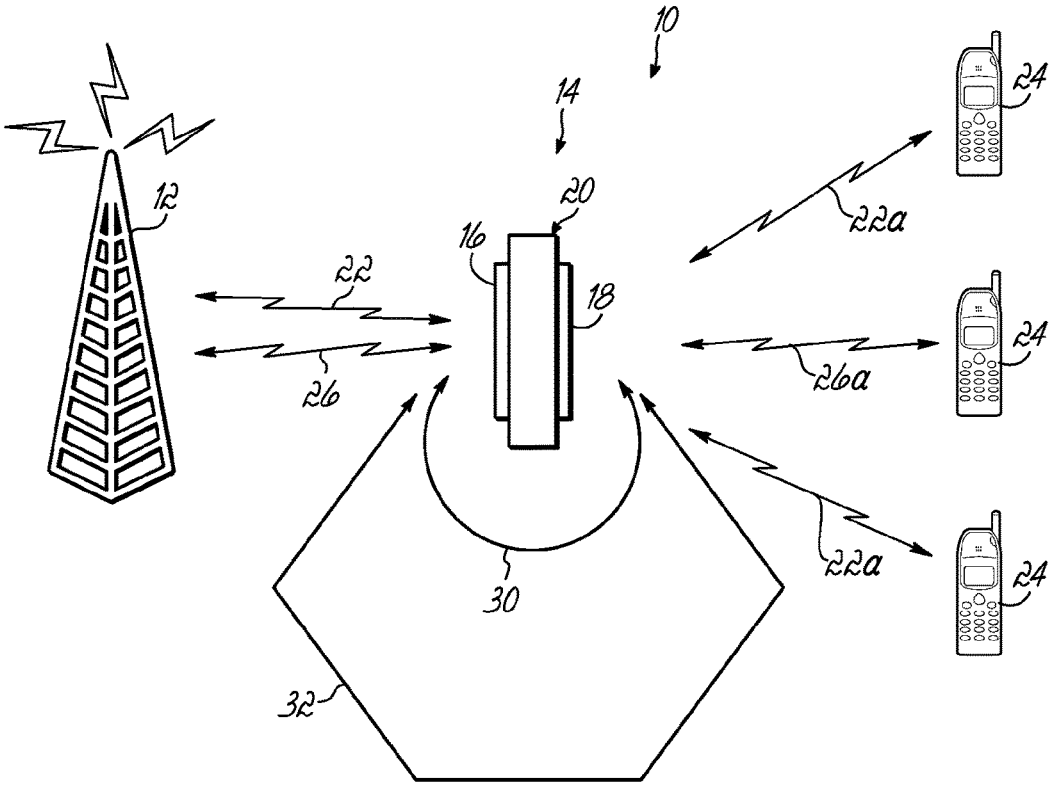
FIG. 1 is a schematic diagram of a repeater utilized within a wireless system for incorporating an embodiment of the present invention.
Figure 2:
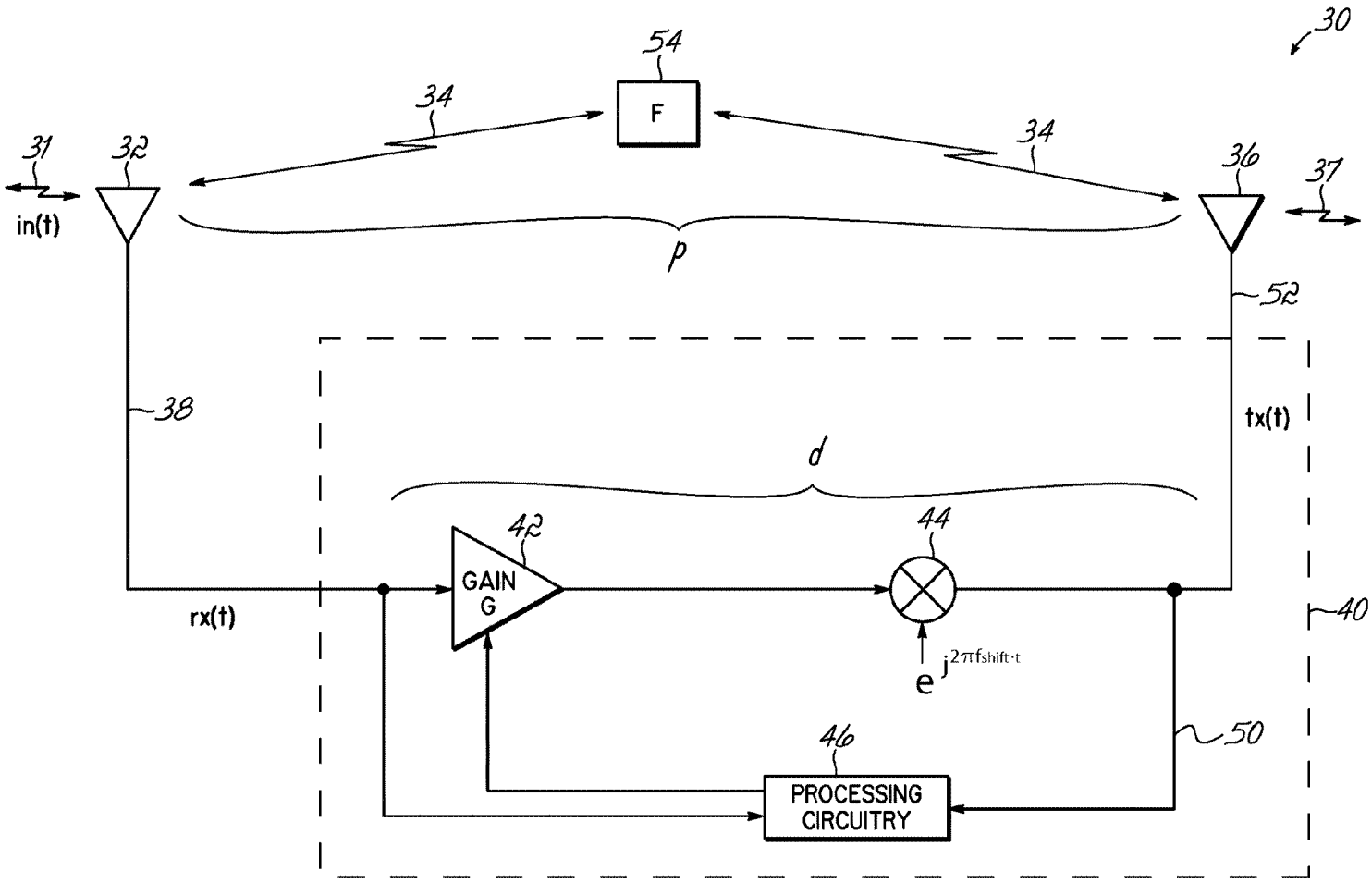
FIG. 2 is a circuit block diagram of a repeater incorporating one embodiment of the present invention.

Referring to FIG. 2, a schematic block diagram of one embodiment of the invention is shown. A repeater 30 incorporates a receive antenna 32 (or donor antenna) for processing input signals 31 or input signals, indicated as in(t). The input in(t) signals 31 represent the input signals to be repeated, such as those that are transmitted from a source, such as a base station 12 (See FIG. 1). Other sources might also be utilized to generate the input signals to be repeated. The feedback signals 34 are also shown in FIG. 2 along with the repeated or transmit signals 37 from transmit antenna 36 (or coverage antenna). The repeated or transmit signals 37 illustrated in FIG. 2 include the transmitted signals or signal portions that are directed to wireless devices, such as cell phones. As such, the feedback signals 34 reach the receive antenna 32. The combination of the input signals in(t) 31 and the feedback signals 34 are combined, in open space, and are received by the receive antenna 32 in an additive sense. The combined input signals in(t) 31 and feedback signals 34 form the receive signal or signals 38 that are the input signals for the repeater. Throughout the application, the terms "signal" or "signals" are used interchangeably herein to refer to the signal(s) handled by the repeater and are not limited to just a single signal or plurality of signals.

For proper signal repeating, repeater 30 includes suitable electronics 40 coupled between the antennas 32, 36. Generally, such electronics will include adjustable gain circuitry 42 that provides a desired gain G in the repeater. In accordance with one aspect of the invention, frequency shift circuitry 44 provides the desired signal modification and frequency shift of the repeated signal in accordance with one aspect of the invention. Processing circuitry 46 is utilized to provide the desired gain margin measurement and to suitably adjust the gain G of the gain circuitry 42. To that end, processing circuitry 46 is appropriately coupled with the gain circuitry 42, and is also configured to receive a portion of the receive signal 38 and a portion 50 of the repeated signal 52 that is then transmitted by antenna 36 resulting in the transmit signal 37 and the feedback signal 34.

Generally, the input or receive signal 38 progresses through repeater 30 to become the repeated signal 52. Repeated signal 52 experiences a delay (d) relative to the receive signal, which is considered the delay of the repeater. Similarly, there will be a propagation delay (p) from the transmit antenna 36 to the receive antenna 32 for the feedback signal 34. Generally, there is a transfer function 54 associated with the feedback signal 34 that provides a feedback gain (F) to the feedback signal. As illustrated in FIG. 2, the frequency shift provided by circuitry 44 is designated as $f_{shift}$.

As may be appreciated, the block diagram of the Figures and the description herein generally illustrates a downlink signal path through the repeater 30, such as from a base station 12 to the mobile devices 24 (See FIG. 1). However, similar uplink path components would be used in the repeater for the uplink direction. Therefore, the discussion herein regarding the downlink signal path also applies to the uplink path.

Figure 3:
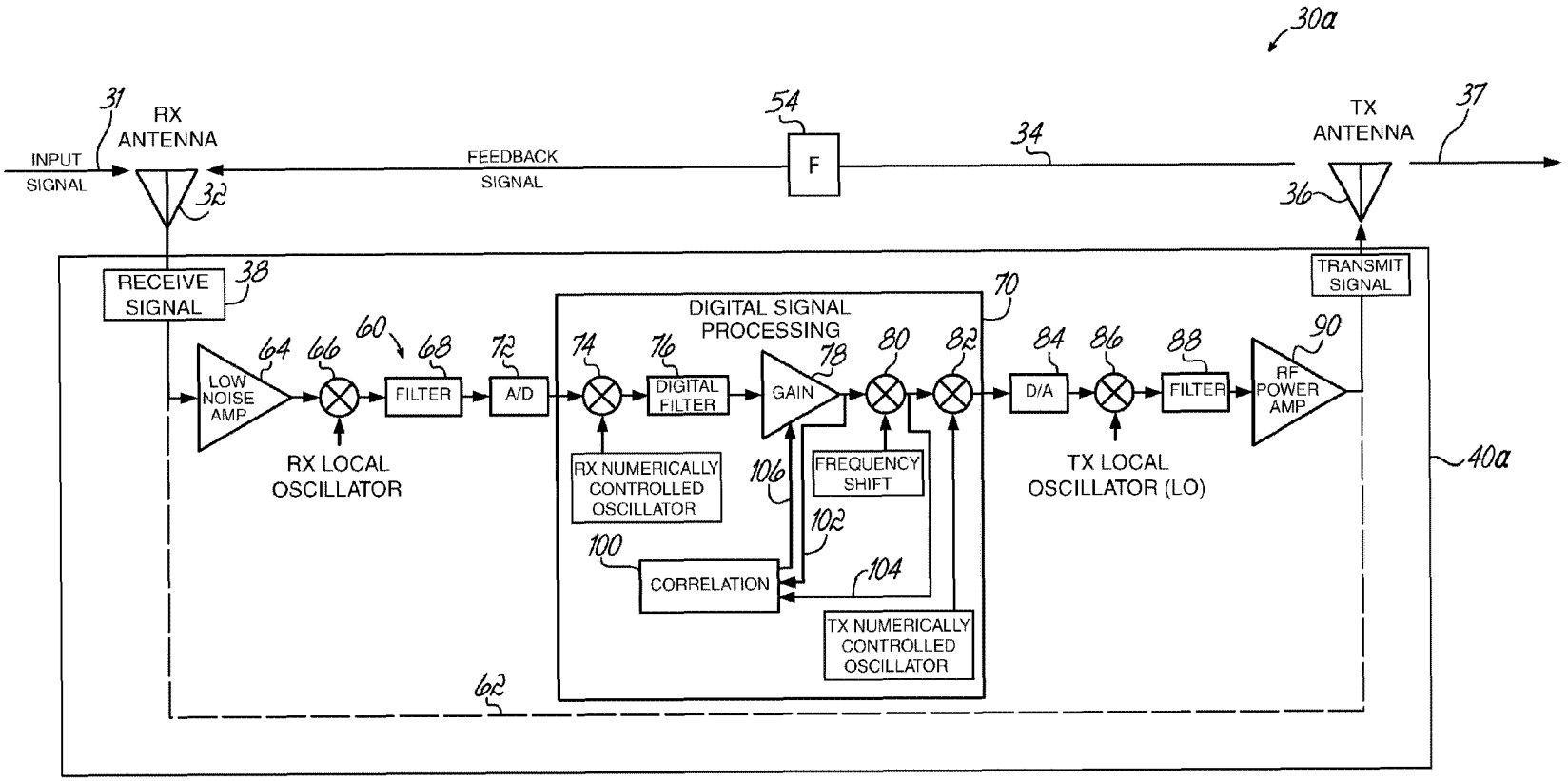
FIG. 3 is another circuit block diagram of a repeater incorporating an embodiment of the present invention.
Figure 4:
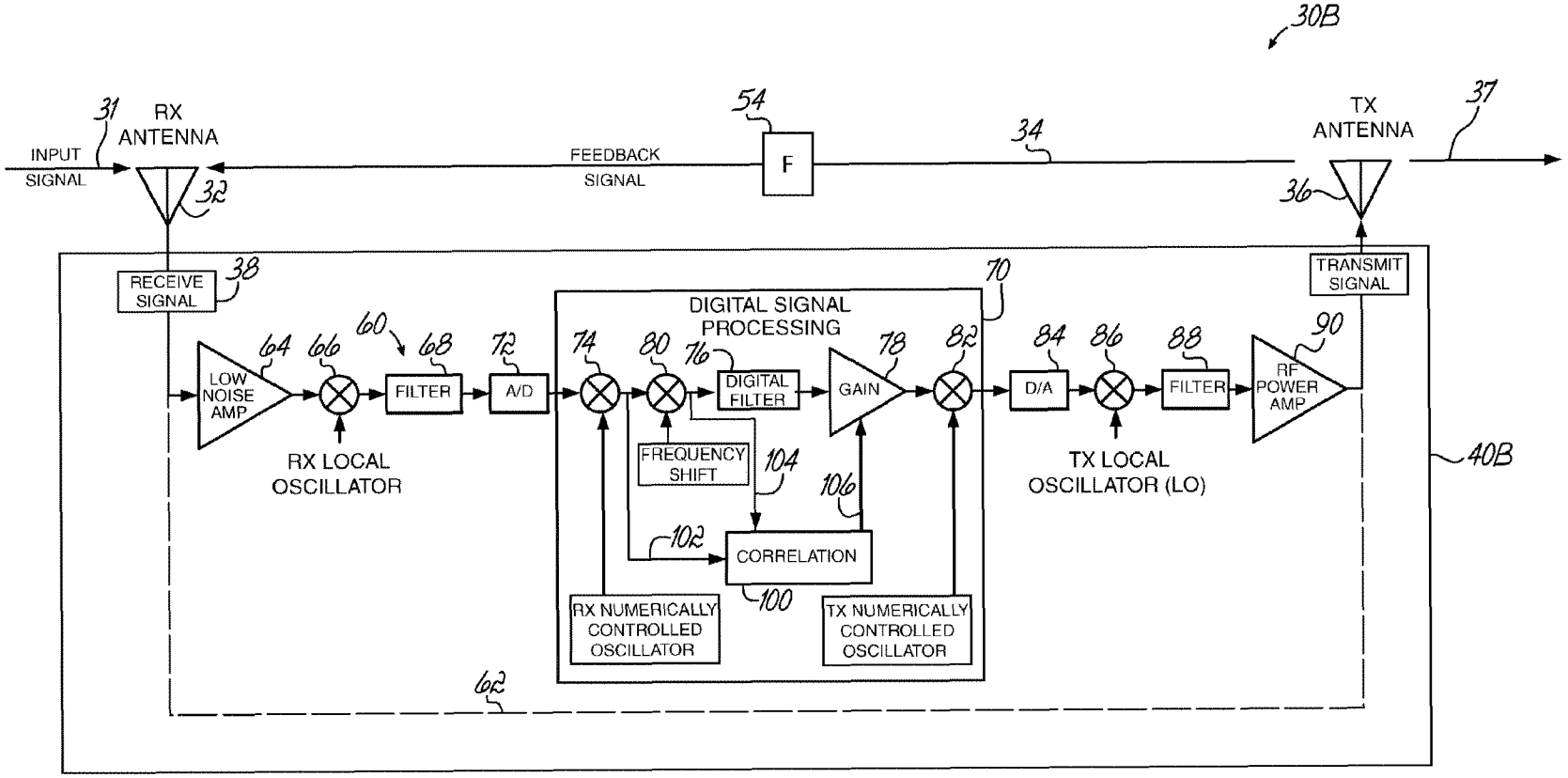
FIG. 4 is another circuit block diagram of a repeater incorporating an embodiment of the invention.

Referring to FIG. 2, the repeater circuitry 40 might process the signals in the analog domain in accordance with aspects of the invention so that the circuitry components 42, 44, and 46 provide the desired amplification or gain, modification (frequency shift), and processing in the analog domain, respectively. Alternatively, electronics 40 of the repeater might provide the various aspects of the invention in the digital domain. As illustrated in FIGS. 3 and 4, embodiments of the invention use combinations of digital and analog components.

As noted, it would be readily understood by a person of ordinary skill in the art that a return path, such as an uplink path, would similarly process signals from the mobile device 24 back to the base station 12 in order to realize the invention. However, discussion of the signal processing in one path is made herein, with an understanding that generally the similar processing occurs and similar circuit components are used in the signal path in the opposite direction as well.

In accordance with one embodiment of the present invention, the input signals or receive signals 38 are modified for decorrelation by being frequency-shifted, utilizing a frequency-shifting circuit 44 to provide transmission or repeated signals that are frequency-shifted from the input signals.

The disclosed embodiment of the present invention utilizes an introduced frequency shift into the repeated signals and cross-correlation of the repeated signals with the receive signals in order to isolate the feedback signals from the input signals.

One way to separately measure the input signal and the feedback signal is to autocorrelate the receive signal with itself. Since the feedback signal is essentially a delayed version of the input signal, the feedback signal will appear as a correlation peak at whatever time the feedback signal is delayed. If the correlation peak of the feedback signal is greater than the autocorrelation profile of the input signal, then the level of the feedback signal can be measured. This method has the advantage in that the gain margin can be measured while the repeater is operating. The method is most effective when the repeater delay is greater than 2-4 times the reciprocal of the modulation bandwidth of the repeated signals because then the feedback signal is delayed beyond that point where there is any significant autocorrelation due to the input signal itself. Such a methodology may be suitable for high bandwidth signals like CDMA and W-CDMA signals. However, narrowband signals have a very wide correlation bandwidth. Therefore, the autocorrelation profile of the input signal is wide relative to typical feedback delay of the repeater. Therefore, the autocorrelation profile masks the feedback signal.

In one specific embodiment of the present invention, a small frequency shift is added to the output of the repeater, or is added to the repeated signals that are transmitted by the repeater. The frequency shift decorrelates the input signal and the feedback signal. This allows the level of the input signal and the feedback signal to be measured separately by cross-correlating the receive signal with the repeated signal. One advantage of the invention is that the gain margin may be measured while the repeater continues to operate and provide service. Furthermore, it provides suitable gain margin measurements even when the autocorrelation profile of the input signal is very wide, such as for narrowband signals. In accordance with one aspect of the invention, the frequency shift $f_{shift}$ is small so that it does not affect system performance significantly.

The methodology of the invention operates based upon the fact that a wide sense stationary random signal cross-correlated with a frequency-shifted version of the same signal that has gone through any linear, time-invariant transformation has an average value of zero. Additionally, a wide sense stationary random signal multiplied by the complex conjugate of the same signal that has been frequency shifted and that has gone through any linear time invariant transformation has a phase that is uniformly distributed from $-\pi$ to $\pi$ with an average value of zero over integer periods of the frequency shift. This property implies that a correlation performed over integer periods of the frequency shift will have an average value of zero. This invention is applicable when the properties of the signals the repeater operates on, or repeats, are or can be transformed to be approximately similar to a wide sense stationary random signal over the measurement interval and when the forward and feedback path can be approximated as a linear, time invariant transform over the measurement interval.

In accordance with one aspect of the invention, the cross-correlations are performed over exactly an integer number of periods of the frequency shift $f_{shift}$ to insure that the average cross-correlation phase is zero. Meeting that criterion, the invention minimizes the measurement period. If the measurement is performed over a non-integer number of periods, then the cross-correlation must be performed over a long enough time such that the average phase is still near zero.

In accordance with one aspect of the invention, a frequency shift is provided to the repeated signal so that the gain margin may be measured by comparing the level of the input signal with the level of the feedback signal. To determine the relative level of the feedback signal 34, the repeated signal output indicated as 37 is cross-correlated with the receive signal 38. The cross-correlation is performed over a time window that is greater than or equal to the maximum time delay of the feedback signal 34 relative to the input signal 31. To determine the relative level of the input signal 31, the frequency shift provided to the output of the repeater or the repeated signal 37 is mathematically removed prior to the cross-correlation, and the resulting unshifted signal is cross-correlated with the receive signal 38. That cross-correlation is performed over a time window that is also greater than or equal to the maximum time delay of the feedback signal 34 relative to the input signal 31. The peak value of the cross-correlation is the relative level of the input signal. The gain margin is then calculated as the ratio of the relative level of the input signal to the relative level of the feedback signal.

In describing the invention, an example is helpful in understanding the use of signal modification and cross-correlation in determining the relative levels of the feedback signal and the input signal. In reviewing the typical case where the repeated signal has a constant level, a zero mean, and no significant autocorrelation peaks other than those caused by the modulation filter, it can be considered to be approximately a wide sense stationary random signal beyond the impulse response of any modulation filter. In the case where the gain and the feedback is static, reference is made to FIG. 2, the input signal 31 is indicated as in(t), the repeater gain as "G", the feedback gain as "F", the repeater delay as "d", and the propagation delay of the feedback signal from the transmit antenna 36 to the receive antenna 32 as "p". The frequency shift is indicated as $f_{shift}$. The receive signal 38 rx(t) is the sum of the input signal 31 in(t) and the feedback signal 34 F·tx(t−p), and it set forth in Equation 1:

$$rx(t)=in(t)+F\cdot tx(t-p) \qquad \text{EQ. 1}$$

The output signal, or repeated signal 37, is then set forth by Equation 2:

$$tx(t)=G\cdot rx(t-d)\cdot e^{j\cdot 2\cdot\pi\cdot fshift\cdot t} \qquad \text{EQ. 2}$$

Therefore, the repeated signal tx(t) reflects the frequency shift of the received signal provided in accordance with one aspect of the present invention by frequency-shifting circuitry 44.

To determine the relative level of the feedback signal 34 in the overall receive signal 38, the repeated signal 37 is cross-correlated with the receive signal 38. Correlation is a linear operation, therefore this cross-correlation is equivalent to the sum of the input signal 31 in(t) cross-correlated with the repeated signal 37 tx(t) and the feedback signal 34 F·tx(t−p) cross-correlated with the repeated signal 37 tx(t). Assuming all signals are WSS over the measurement interval, the cross correlation of in(t) with tx(t) will have an average value of zero because the signals are uncorrelated due the frequency shift. The cross correlation F·tx(t−p) with tx(t) will have an average value of $F\cdot tx_{rms}^2$ at t=p.

To determine the relative level of the input signal in(t) in the receive signal 38, the frequency shift is mathematically removed from the repeated signal 52 tx(t) prior to calculating the cross-correlation, and the unshifted repeated signal is then cross-correlated with the receive signal 38. The frequency shift can be mathematically removed by multiplying it with a complex exponential with the negative of the frequency shift as shown in EQ. 3.

$$tx_{unshift}(t)=tx(t)\cdot e^{-j\cdot 2\cdot\pi\cdot fshift\cdot t} \qquad \text{EQ. 3}$$

Again, since correlation is a linear operation, rx(t−d) can be split into its components, in(t) and F·tx(t−p). Since the frequency shift has been removed, $tx_{unshift}(t)$ is uncorrelated with F·tx(t−p) and has an average value of zero, while $tx_{unshift}$ is correlated with in(t) and has an average value proportional to $G^{-1}\cdot tx_{rms}^2$ at t=d.

Therefore, the gain margin may then be calculated as a ratio of the cross correlations of rx(t) with $tx_{unshift}(t)$ at t=d and tx(t) with rx(t) at t=p.

$$\frac{\frac{1}{G}tx_{rms}^2}{F \cdot tx_{rms}^2} = \frac{1}{G \cdot F} \quad \text{EQ. 4}$$

In another embodiment of the invention, the ratio of the input and feedback signals is determined by other methodology that relies upon the fact that the input signal and feedback signal are decorrelated due to the applied frequency shift of the repeated signal. In an alternative embodiment, the average power of the receive signal can be calculated, $rx_{rms}^2$. The relative level of the feedback signal in the receive signal is then calculated as the cross-correlation of the receive signal with the receive signal shifted by the negative of the frequency shift provided by the transmission circuitry of the invention. For ease of understanding, the feedback signal in this case is represented as the delayed input signal multiplied by the loop gain of the repeater multiplied by the frequency shift, $G \cdot F \cdot rx(t-d-p) \cdot e^{j \cdot 2 \cdot \pi \cdot fshift \cdot t}$. The receive signal can then be represented as the sum of the input signal and the feedback signal as shown in EQ. 5.

$$rx(t)=in(t)+G \cdot F \cdot rx(t-d-p) \cdot e^{j \cdot 2 \cdot \pi fshift \cdot t} \quad \text{EQ. 5}$$

The receive signal shifted by the negative of the frequency shift fshift is shown in EQ. 6

$$rx_{unshift}(t)=in(t) \cdot e^{-j \cdot 2 \cdot \pi \cdot fshift \cdot t}+G \cdot F \cdot rx(t-d-p) \quad \text{EQ. 6}$$

Again, since cross correlation is a linear operation, the cross correlation of rx(t) with $rx_{shift}(t)$ is equivalent to the sum of the input signal 31 in(t) with a negative frequency shift applied cross-correlated with the receive signal rx(t) and the feedback signal $G \cdot F \cdot rx(t-d-p)$ cross correlated with rx(t). Assuming all signals are WSS over the measurement interval, and G and F are linear, time-invariant systems, then the cross correlation of $in(t) \cdot e^{-j \cdot 2 \cdot \pi \cdot fshift \cdot t}$ with rx(t) will have an average value of zero because the signals are uncorrelated. The cross correlation $G \cdot F \cdot rx(t-d-p)$ with rx(t) has an average value of $G \cdot F \cdot rx_{rms}^2$ at t=d+p. The gain margin can then be calculated as the ratio of the average power of rx(t) to the cross-correlation of rx(t) and $rx_{shift}(t)$ as shown in EQ. 7.

$$\frac{rx_{rms}^2}{G \cdot F \cdot rx_{rms}^2} = \frac{1}{G \cdot F} \quad \text{EQ. 7}$$

In accordance with another aspect of the present invention, the correlation circuitry insures that the average phase of the cross-correlation is zero, while minimizing the number of computations. If the frequency shift is small and the bandwidth of the signal is very large, then the calculations are performed over a large number of samples. However, to minimize the number of computations, one embodiment of the invention performs a windowed cross-correlation. The windows are equally distributed throughout one period of the frequency shift $f_{shift}$. For instance, if the frequency shift was one Hertz, the correlation would have to be performed over a one-second period. However, if a window were applied from 0-0.1 seconds and 0.5-0.6 seconds, then the average phase of the cross-correlations would still sum to zero. Generally, any number of windows can be used as long as the average phase of the cross-correlations equals zero.

In one embodiment, the correlation circuitry or processing circuitry assumes that the magnitude of the repeated signal is approximately constant throughout the measurement period. If the magnitude of the signal's envelope varies greatly during the measurement, the sum of the correlations may not add to zero. In accordance with another embodiment of the invention, to compensate for the problem, the receive and repeated/transmit signals are normalized so that they have a constant envelope prior to the correlation calculations. Normalization does not change the ratio of the input signal to the feedback signal. If the receive signal and repeated signal are normalized by the same function, the methodology of the invention continues to provide the desired results.

In accordance with another feature of the invention, one embodiment of the invention may provide a constant frequency shift that is always applied to the repeated signal. Alternatively, the frequency shift feature is selectable and may be selectively turned ON or OFF selectively as the gain margin measurement is needed.

Furthermore, in another embodiment of the invention, the frequency shift may be selectively varied both in the amount of the frequency shift, and also the sign of the shift. For example, the invention may alternate between a positive frequency shift and a negative frequency shift so that the overall average frequency shift utilized in the invention is zero.

Turning now to FIGS. 3 and 4, those figures set forth schematic diagrams with respect to various embodiments of the invention. In FIG. 3, the frequency shift is supplied after the gain block within the repeater circuitry. In FIG. 4, the frequency shift is applied prior to the gain block. However, it will be understood that the frequency shift circuitry might be implemented anywhere between the receive input and the transmit output in accordance with the principles of the invention.

Turning to FIG. 3, where like reference numerals are utilized, repeater 30a incorporates a receive antenna 32 and transmit antenna 36 coupled with appropriate repeater circuitry 40a. As will be understood by a person of ordinary skill in the art, the components are shown in a downlink path 60 in the repeater 30a. Similar components will exist in the uplink path 62 for handling uplink traffic between wireless devices and a base station for example. Accordingly, components within the downlink path 60 will be described herein in further detail with the assumption that similar functionality and components would be utilized in the uplink path 62.

Receive antenna 32 receives both the input signal and frequency shifted or modified feedback signal. That receive signal is coupled to a low noise amplifier (LNA) 64 for amplifying downlink RF receive signals from a base station. A mixer component 66 is fed by an appropriate local oscillator (LO) signal and converts the RF receive signal 38 to an IF signal at a different IF frequency or a frequency at or near the baseband frequency for ease of later processing in the repeater. The signal is then filtered by a filter component or circuitry 68. In the embodiments illustrated in FIGS. 3 and 4, the repeater circuitry incorporates both analog and digital components. Digital signal processing circuitry 70 is implemented for adjusting gain as well as for providing the necessary modification, such as a frequency shift $f_{shift}$, to the repeater signal before it is transmitted as a repeated signal. Appropriately, an A/D converter circuit 72 converts the analog signal to an appropriate digital signal for further digital processing. The digital signal is sent to DSP circuitry 70 that might be an FPGA, digital signal processor or other such element. The DSP circuitry might include an additional digital mixer circuit 74 fed by a suitable numerically-controlled oscillator (NCO) signal to provide digital downconversion for ease of further processing. The signal might also be filtered by an appropriate digital filter 76. Filter 76 might also change the amplitude of the signal. Component 78 represents suitable circuitry for adjusting the gain within repeater 30a. Although as noted, the gain component might be implemented together with the filter 76. In accordance with one noted aspect of the invention, frequency-shifting circuitry 80 provides the desired frequency shift within the repeated signals in order to provide the proper decorrelation between the feedback signal 34 and the input signal 31. The signal has a frequency shift added by mixing it with the frequency shift oscillator. The signal might then be digitally upconverted by appropriate digital upconversion circuitry 82 fed by a transmit NCO. The signal may then be converted to back to an analog signal by D/A circuitry 84.

The analog signal, such as at analog IF, is further upconverted with mixer circuitry 86 fed by an appropriate transmit LO to an appropriate RF signal. The RF signal is filtered by filter circuitry 88, and then fed to an RF power amplifier 90 before being transmitted as a repeated signal through the transmit antenna 36.

The mixing elements are typical of a repeater. There can be more or fewer mixing elements than illustrated in the examples and still implement a functional repeater. In one embodiment, the frequency shift mixing operation can be combined with one or more of the other mixers if desired. However, the mixing operations must be implemented such that the frequency of the input signal and the frequency of the transmit or repeated signal differ by the amount of the frequency shift. The frequency shift mixer is shown after the filter; however, t can be placed anywhere between the receive and transmit antennas. In FIG. 4 it is shown prior to the filter and/or gain block.

In the embodiments illustrated in FIGS. 3 and 4, the noted correlation functionality is provided by suitable correlation circuit 100 within the digital signal processing (DSP) circuitry 70. The correlations to determine gain margin are performed by a capturing samples of the signal in the digital path and performing the described calculations. The capture point may be anywhere in the signal path, either before or after the frequency shift circuit because the circuit has the ability to add or remove the applied frequency shift by mathematical computation. In the illustrated embodiments, the correlation circuit samples the receive signal 38 via suitable connections 102 and also is coupled to sample the frequency-shifted repeated signal in the repeater path as illustrated by the appropriate connection 104. Correlation circuit 100 may also provide the necessary functionality for automatically controlling the gain through the gain component 78 by way of line 106 based on the measured correlations and determined gain margin. It would be understood by a person of ordinary skill in the art that the various functionality within the digital signal processing circuitry 70 might be implemented in a number of different ways to achieve the functionality of the invention. Accordingly, the illustrations in FIGS. 3 and 4 are not limiting. That is, the specific details regarding how the various components are utilizing and arranged within the DSP circuitry 70 and the overall computer circuitry 40a are illustrative, and not meant to be limiting.

Turning to FIG. 4, like reference numerals are utilized with respect to the components in FIG. 3. FIG. 4 illustrates a repeater 30b of the invention wherein the frequency shift circuitry 80 is positioned prior to the gain block or gain circuitry 78 within the repeater circuitry 40b.

In a static case, the frequency shift of the feedback signal 34 would be identical to the frequency shift of the repeated signals 37. However, in some implementations of the invention, there might be additional frequency shifting between the repeated signal 37 and the feedback signal 34 due to Doppler shifting, or other parameters and conditions within the installation and operation of the repeater. To that end, in one embodiment, the invention measures and accounts for the additional frequency shifting in the cross-correlation calculations. For example, this might be done by examining or measuring how the phase of the cross-correlation changes throughout the correlation period. By finding constant changes in the correlation phase during the correlation period, the phase change due to any additional frequency shift can be readily determined. If more or less of an integer number of phase rotations are observed in the measurement, then the correlation result can be truncated or extrapolated respectively to account for the additional frequency shift. In an alternative embodiment of the invention, the circuitry provides a compensating amount of frequency shift that is added or subtracted during the correlation calculation to negate the affect of any additional frequency shift associated with the environment and installation. This functionality will be implemented in the digital signal processing circuitry as suitable in the circuits of FIGS. 3 and 4.

In one aspect of the invention, once the gain margin measurement is determined, the gain is automatically adjusted by the DSP circuitry 70, and specifically gain block or component 78. The gain may be automatically adjusted to ensure that the gain margin is above an acceptable level to insure proper operation. As will be understood, the gain margin might be adjusted through the DSP control circuitry as well as the specific gain adjustment parameters. The gain margin is usually greater than 0 dB in order to prevent oscillation. In fact, it is usually kept well above 0 dB to allow for variation in repeater gain, and antenna isolation. The present invention, by constantly measuring the gain margin as noted herein, provides automatic gain adjustment so that the repeater can compensate for any variation in the gain margin. In that way, the minimum threshold that has to be maintained might be reduced as the repeater is able to constantly automatically adjust the gain margin. As discussed above with respect to the correlation calculations, one embodiment of the invention might use a complex sinusoid to frequency shift the repeated signal that is output. However, one of ordinary skill in the art would realize that other signals might be used to modify the repeated signals with respect to the received signal to thereby decorrelate the repeated signal from the receive signal. Such modification must have minimal affect on the repeated or transmitted output of the repeater.

The invention, as described with respect to various embodiments herein, wherein the frequency shift and correlation calculations are implemented in the digital domain, such as through DSP circuitry 70. However, such frequency shifting and decorrelation might also be implemented in the analog domain. Alternatively, a mixed signal implementation using both analog and digital components might be utilized to provide the desired signal decorrelation functions and correlation calculations.

The invention, as described with respect to various embodiments herein, wherein the decorrelating function applied to the repeated signal is a frequency shift, could apply other decorrelating functions that cause minimal degradation of the repeated signal. The methods described herein could be readily adapted by a person of ordinary skill in the art to use alternate decorrelation functions to measure gain margin and control the gain of a repeater to maintain a minimum gain margin.

As noted above, while a repeater is described herein as an exemplary embodiment, the invention might be applied to any type of signal repeating system wherein some part of the transmitted or repeated signal is fed back or finds its way into the input on the receive side as a feedback signal.

Having described this invention in its various embodiments and parameters, other variations will become apparent to a person of ordinary skill in the art without deviating from the scope of the described embodiments and the invention.

What is claimed is:

1. An apparatus for repeating signals, the apparatus comprising:

a receive antenna for capturing a receive signal that includes an input signal and a feedback signal;

processing circuitry coupled with the receive antenna for processing the receive signal to form a repeated signal;

a transmit antenna coupled with the processing circuitry for transmitting the repeated signal;

the processing circuitry for processing the receive signal including:

gain circuitry to provide gain in the repeated signal;

decorrelation circuitry including frequency shifting circuitry that is configured for decorrelating the input signal of the receive signal and the repeated signal by introducing a frequency shift in the repeated signal to form the repeated signal that is decorellated and frequency-shifted from the input signal of the receive signal;

gain margin circuitry configured for calculating a gain margin for the apparatus by utilizing samples of the decorrelated receive signal and the frequency-shifted repeated signal and utilizing samples of the repeated signal wherein the frequency shift that is used to decorrelate the receive and repeated signals has been removed.

2. The apparatus of claim 1 wherein the frequency shifting circuitry is operable for creating the frequency shift by multiplying the input signal with a complex sinusoid.

3. The apparatus of claim 1 wherein the processing circuitry is further operable for adjusting the gain based upon the calculated gain margin.

4. The apparatus of claim 1 wherein the gain margin circuitry determines the gain margin by comparing a cross-correlation of the receive signal and the repeated signal with a cross-correlation of the receive signal and the repeated signal wherein the frequency shift used to decorrelate the receive signal has been removed.

5. The apparatus of claim 4 wherein the receive signal includes both the input signal and the feedback signal, cross-correlations being performed over a sufficient correlation length so that an average phase of the feedback signal relative to the input signal is around zero degrees.

6. The apparatus of claim 4 wherein cross correlations are performed over a correlation length that is an integer number of periods of the frequency shift.

7. The apparatus of claim 4 wherein cross correlations are windowed, the windowing being performed so that an average phase of the cross correlations is around zero degrees.

8. The apparatus of claim 4 wherein the processing circuitry normalizes the input signal to have generally a constant envelope.

9. The apparatus of claim 5 wherein the processing circuitry is further configured for determining additional frequency shifting in the feedback signal and providing a compensating amount of frequency shift for cross-correlations to reduce the effect of the additional frequency shifting.

10. The apparatus of claim 1 wherein the processing circuitry is configured to dynamically increase or decrease the amount of frequency shift provided by the frequency shifting circuit to the input signal.

11. The apparatus of claim 1 wherein the decorrelation circuitry is selectively turned ON and OFF for selectively calculating the gain margin.

12. The apparatus of claim 1 wherein the processing circuitry is implemented at least partially with digital circuitry.

13. A method for repeating signals comprising:

capturing a receive signal with a receive antenna, the receive signal including an input signal and a feedback signal;

processing the receive signal with processing circuitry to form a repeated signal;

transmitting the repeated signal;

the processing steps including:

providing gain in the repeated signal;

decorrelating the input signal of the receive signal and the repeated signal by introducing a frequency shift in the repeated signal to form the repeated signal that is decorrelated and frequency-shifted from the input signal of the receive signal;

calculating a gain margin for the apparatus by utilizing samples of the decorrelated receive signal and the frequency-shifted repeated signal and utilizing samples of the repeated signal wherein the frequency shift that is used to decorrelate the receive and repeated signals has been removed.

14. The method of claim 13 further including creating a frequency shift by multiplying the input signal with a complex sinusoid.

15. The method of claim 13 further comprising adjusting the gain based upon the calculated gain margin.

16. The method of claim 13 wherein calculating the gain margin includes comparing a cross-correlation of the receive signal and the repeated signal with a cross-correlation of the receive signal and the repeated signal wherein the frequency shift used to decorrelate the receive signal has been removed.

17. The method of claim 16 wherein the receive signal includes both the input signal and the feedback signal, and further comprising performing cross-correlations over a sufficient correlation length so that an average phase of the feedback signal relative to the input signal is around zero degrees.

18. The method of claim 16 further comprising performing cross correlations over a correlation length that is an integer number of periods of the frequency shift.

19. The method of claim 16 further comprising windowing cross correlations so that an average phase of the cross correlations is around zero degrees.

20. The method of claim 16 further comprising normalizing the input signal to have generally a constant envelope.

21. The method of claim 16 further comprising determining additional frequency shifting in the receive signal and providing a compensating amount of frequency shift for cross correlations to reduce the effect of the additional frequency shifting.

22. The method of claim 13 further comprising dynamically increasing or decreasing the amount of frequency shift provided by the frequency shifting circuit to the input signal.

23. The method of claim 13 further comprising selectively turning the decorrelation circuitry ON and OFF for selectively calculating the gain margin.

*24. An apparatus for repeating signals, the apparatus comprising:*

*a receive antenna configured to capture a receive signal;*

*a transmit antenna configured to transmit a repeated signal formed from the receive signal;*

*gain circuitry configured to provide gain in the repeated signal;*

*decorrelation circuitry configured to modify the repeated signal and including frequency shifting circuitry operable to create a frequency shift in the repeated signal with respect to the receive signal, wherein the repeated signal is frequency shifted and decorrelated from the receive signal; and*

*gain margin circuitry configured to calculate a gain margin for the apparatus utilizing the decorrelated receive and repeated signals, the gain margin circuitry utilizing a repeated signal that is shifted in frequency by the negative of the frequency shift used to decorrelate the receive and repeated signal.*

*25. The apparatus of claim 24, further comprising processing circuitry configured to adjust the gain based upon the calculated gain margin.*

*26. The apparatus of claim 24, wherein the gain margin circuitry is configured to calculate the gain margin by comparing a cross-correlation of the receive signal and the repeated signal with a cross-correlation of the receive signal and the repeated signal that is shifted in frequency by the negative of the frequency shift used to decorrelate the receive signal and repeated signal.*

*27. The apparatus of claim 26, wherein the receive signal includes both an input signal and a feedback signal, the cross-correlations being performed over at least one of a length of the correlation that is an integer number of periods of the frequency shift or a length of the correlation that is a sufficient length so that an average cross-correlation phase of the feedback signal relative to the input signal is around zero degrees.*

*28. The apparatus of claim 26, wherein the cross-correlations are windowed, the windowing being performed so that an average phase of the cross-correlations is around zero degrees.*

*29. The apparatus of claim 26, further comprising processing circuitry configured to normalize the receive and repeated signals to have generally a constant envelope.*

*30. The apparatus of claim 26, further comprising processing circuitry configured to determine additional frequency shifting in the feedback signal and provide a compensating amount of frequency shift for the cross-correlations to reduce the effect of the additional frequency shifting.*

*31. The apparatus of claim 24, further comprising processing circuitry configured to dynamically increase or decrease the amount of frequency shift provided by the frequency shifting circuitry to the repeated signal.*

*32. The apparatus of claim 24, wherein the gain circuitry, the decorrelation circuitry, and the gain margin circuitry are implemented in different circuits.*

*33. The apparatus of claim 24, wherein at least two of the gain circuitry, the decorrelation circuitry, and the gain margin circuitry are implemented in the same circuit.*

*34. The apparatus of claim 24, wherein the gain circuitry, the decorrelation circuitry, and the gain margin circuitry are implemented in the same circuit.*

*35. The apparatus of claim 24, further comprising:*

*a first mixer configured to down-convert the receive signal from a radio frequency to an intermediate frequency or baseband frequency;*

*an analog-to-digital converter configured to convert the down-converted receive signal to a digital signal, wherein the gain circuitry provides gain to the digital signal, wherein the decorrelation circuitry shifts the frequency of the digital signal; and*

*a digital-to-analog converter configured to convert the digital signal to an analog signal;*

*a second mixer configured to up-convert the analog signal to a radio frequency signal, wherein the radio frequency signal is provided to the transmit antenna for transmission as the repeated signal.*

*36. The apparatus of claim 24, wherein the gain circuitry, decorrelation circuitry, and the gain margin circuitry are implemented in the analog domain.*

*37. A method for repeating signals comprising:*

*capturing a receive signal;*

*transmitting a repeated signal formed from the receive signal;*

*providing gain in the repeated signal;*

*modifying the repeated signal by creating a frequency shift in the repeated signal with respect to the receive signal, wherein the repeated signal is frequency shifted and decorrelated from the receive signal;*

*calculating a gain margin for the apparatus utilizing the decorrelated receive and repeated signals and utilizing a repeated signal that is shifted in frequency by the negative of the frequency shift used to decorrelate the receive signal and repeated signal.*

*38. The method of claim 37, further comprising adjusting the gain based upon the calculated gain margin.*

*39. The method of claim 37, wherein calculating the gain margin includes comparing a cross-correlation of the receive signal and the repeated signal with a cross-correlation of the receive signal and the repeated signal that is shifted in frequency by the negative of the frequency shift used to decorrelate the receive signal and repeated signal.*

*40. The method of claim 39, wherein the receive signal includes both an input signal and a feedback signal, and further comprising performing the cross-correlations over at least one of a length of the correlation that is an integer number of periods of the frequency shift or a length of the correlation that is a sufficient length so that an average cross-correlation phase of the feedback signal relative to the input signal is around zero degrees.*

*41. The method of claim 39, further comprising normalizing the receive and repeated signals to have generally a constant envelope.*

*42. The method of claim 39, further comprising determining additional frequency shifting in the receive signal and providing a compensating amount of frequency shift for the cross-correlations to reduce the effect of the additional frequency shifting.*

*43. The method of claim 37, further comprising dynamically increasing or decreasing the amount of frequency shift provided by the frequency shifting circuit to the repeated signal.*

*44. The method of claim 37, further comprising:*

*down-converting the receive signal to an intermediate frequency or baseband frequency;*

*converting the down-converted receive signal to a digital signal, wherein gain is provided to the digital signal, wherein the digital signal is frequency shifted;*

*converting the digital signal to an analog signal; and*

*up-converting the analog signal to a radio frequency signal, wherein the radio frequency signal is transmitted as the repeated signal.*

*45. The method of claim 37, wherein providing gain in the repeated signal, modifying the repeated signal, and calculating the gain margin are implemented in the analog domain.*

*46. An apparatus for repeating signals, the apparatus comprising:*

*a receive input to couple the apparatus to a receive antenna, wherein the receive antenna is configured to capture a receive signal, wherein the receive input is configured to obtain the receive signal from the receive antenna;*

*a transmit output to couple the apparatus to a transmit antenna, wherein the transmit output is configured to provide a repeated signal formed from the receive signal to the transmit antenna, wherein the transmit antenna is configured to transmit the repeated signal;*

*gain circuitry configured to provide gain in the repeated signal;*

*decorrelation circuitry configured to modify the repeated signal and including frequency shifting circuitry operable to create a frequency shift in the repeated signal with respect to the receive signal, wherein the repeated signal is frequency shifted and decorrelated from the receive signal; and*

*gain margin circuitry configured to calculate a gain margin for the apparatus utilizing the decorrelated receive and repeated signals, the gain margin circuitry utilizing a repeated signal that is shifted in frequency by the negative of the frequency shift used to decorrelate the receive and repeated signal.*

*47. The apparatus of claim 46, further comprising processing circuitry configured to adjust the gain based upon the calculated gain margin.*

*48. The apparatus of claim 46, wherein the gain margin circuitry is configured to calculate the gain margin by comparing a cross-correlation of the receive signal and the repeated signal with a cross-correlation of the receive signal and the repeated signal that is shifted in frequency by the negative of the frequency shift used to decorrelate the receive signal and repeated signal.*

*49. The apparatus of claim 48, wherein the receive signal includes both an input signal and a feedback signal, the cross-correlations being performed over at least one of a length of the correlation that is an integer number of periods of the frequency shift or a length of the correlation that is a sufficient length so that an average cross-correlation phase of the feedback signal relative to the input signal is around zero degrees.*

*50. The apparatus of claim 48, wherein the cross-correlations are windowed, the windowing being performed so that an average phase of the cross-correlations is around zero degrees.*

*51. The apparatus of claim 48, further comprising processing circuitry configured to normalize the receive and repeated signals to have generally a constant envelope.*

*52. The apparatus of claim 48, further comprising processing circuitry configured to determine additional frequency shifting in the feedback signal and provide a compensating amount of frequency shift for the cross-correlations to reduce the effect of the additional frequency shifting.*

*53. The apparatus of claim 46, further comprising processing circuitry configured to dynamically increase or decrease the amount of frequency shift provided by the frequency shifting circuitry to the repeated signal.*

*54. The apparatus of claim 46, wherein the gain circuitry, the decorrelation circuitry, and the gain margin circuitry are implemented in different circuits.*

*55. The apparatus of claim 46, wherein at least two of the gain circuitry, the decorrelation circuitry, and the gain margin circuitry are implemented in the same circuit.*

*56. The apparatus of claim 46, wherein the gain circuitry, the decorrelation circuitry, and the gain margin circuitry are implemented in the same circuit.*

*57. The apparatus of claim 46, further comprising:*

*a first mixer configured to down-convert the receive signal from a radio frequency to an intermediate frequency or baseband frequency;*

*an analog-to-digital converter configured to convert the down-converted receive signal to a digital signal, wherein the gain circuitry provides gain to the digital signal, wherein the decorrelation circuitry shifts the frequency of the digital signal; and*

*a digital-to-analog converter configured to convert the digital signal to an analog signal;*

*a second mixer configured to up-convert the analog signal to a radio frequency signal, wherein the radio frequency signal is provided to the transmit antenna for transmission as the repeated signal.*

*58. The apparatus of claim 46, wherein the gain circuitry, decorrelation circuitry, and the gain margin circuitry are implemented in the analog domain.*

* * * * *